United States Patent
Sipila et al.

(10) Patent No.: US 9,146,163 B2
(45) Date of Patent: Sep. 29, 2015

(54) PROXIMITY AND STRAIN SENSING

(71) Applicant: GENERAL ELECTRIC COMPANY, Schenectady, NY (US)

(72) Inventors: Pekka Tapani Sipila, Munich (DE); Sherrie Clark, Solon, OH (US); Charles T. Hatch, Gardnerville, NV (US); Lam Arthur Campbell, Tomball, TX (US)

(73) Assignee: General Electric Company, Niskayuna, NY (US)

( * ) Notice: Subject to any disclaimer, the term of this patent is extended or adjusted under 35 U.S.C. 154(b) by 213 days.

(21) Appl. No.: 13/729,649

(22) Filed: Dec. 28, 2012

(65) Prior Publication Data

US 2014/0182388 A1    Jul. 3, 2014

(51) Int. Cl.
*G01L 1/12* (2006.01)

(52) U.S. Cl.
CPC ............. *G01L 1/127* (2013.01); *G01L 1/125* (2013.01); *Y02E 20/16* (2013.01)

(58) Field of Classification Search
CPC .................................................. G01L 1/12
USPC ..................................... 73/799, 779
See application file for complete search history.

(56) References Cited

U.S. PATENT DOCUMENTS

| | | | |
|---|---|---|---|
| 3,916,699 A * | 11/1975 | Moran et al. | ............ 73/623 |
| 4,899,598 A | 2/1990 | Gumaste et al. | |
| 5,495,774 A | 3/1996 | Klauber et al. | |
| 5,542,304 A | 8/1996 | Sasada et al. | |
| 5,808,202 A * | 9/1998 | Passarelli, Jr. | ............ 73/643 |
| 5,902,934 A * | 5/1999 | Sprague et al. | ............ 73/779 |
| 6,912,911 B2 | 7/2005 | Oh et al. | |
| 6,966,232 B2 | 11/2005 | Asaumi et al. | |
| 6,978,686 B2 | 12/2005 | Shimizu et al. | |
| 7,034,522 B2 * | 4/2006 | Gester | ........ 324/207.16 |
| 7,631,564 B1 | 12/2009 | Sihler et al. | |
| 7,845,243 B2 | 12/2010 | Poirier et al. | |
| 8,004,813 B2 | 8/2011 | May | |
| 8,222,897 B2 | 7/2012 | Sheiretov et al. | |
| 2012/0126833 A1 | 5/2012 | Dooley | |
| 2015/0028859 A1 | 1/2015 | Lutz May | |

FOREIGN PATENT DOCUMENTS

| | | |
|---|---|---|
| DE | 3437379 A1 | 4/1985 |
| GB | 2383417 A | 6/2003 |

OTHER PUBLICATIONS

"Contactless Torque Sensor CTS," Cedrat Technologies, May 2010, pp. 1-2.

(Continued)

*Primary Examiner* — Lisa Caputo
*Assistant Examiner* — Octavia Hollington
(74) *Attorney, Agent, or Firm* — Jason K. Klindtworth (57) ABSTRACT

There is set forth herein a method comprising applying a drive signal to a drive element in a sensor assembly having a drive element and one or more sensor element so that responsively to the drive signal the drive element generates a magnetic flux that travels through a target, determining a strain of the target using a picked up output signal picked up by the one or more sensor element. In one embodiment, a sensor assembly can be employed for detecting a proximity of the target using a picked up output signal picked up by e.g., the drive element. In one embodiment, a drive signal can have a plurality of frequency components.

25 Claims, 7 Drawing Sheets

(56) References Cited

OTHER PUBLICATIONS

William J. Fleming; "Magnetostrictive Torque Sensors—Derivation of Transducer Model," SAE Technical Paper Series, International Congress and Exposition, Detroit, Michigan, Feb. 27-Mar. 3, 1989, pp. 81-100.

International Search Report issued in connection with corresponding PCT Application No. PCT/US13/072816 on Aug. 1, 2014.

* cited by examiner

PROXIMITY AND STRAIN SENSING

BACKGROUND

The invention relates generally to sensors and particularly to sensor assemblies for sensing characteristics of a target.

Non contact sensor assemblies are available for sensing characteristics of a target such as rotating shafts of turbines and other machinery. A drive element can be disposed and controlled to generate a magnetic flux that is transmitted through the target and a sensor element can be disposed to sense a returned magnetic flux. Changes in inductivity and resistance resulting from permeability fluctuations of a target under stress can be observed for detection of stresses and strain of the target. Magnetic flux sensor assemblies can be used for sensing strain in uniaxial stress environments, biaxial stress environments and complex stress environments.

BRIEF DESCRIPTION

There is set forth herein a method comprising applying a drive signal to a drive element in a sensor assembly having a drive element and one or more sensor element so that responsively to the drive signal the drive element generates a magnetic flux that travels through a target, determining a strain of the target using a picked up output signal picked up by the one or more sensor element. In one embodiment, a sensor assembly can be employed for detecting a proximity of the target using a picked up output signal picked up by e.g., the drive element. In one embodiment, a drive signal can have a plurality of frequency components.

There is set forth herein, in one embodiment, a method comprising applying a drive signal to a drive element in a sensor assembly having a drive element and one or more sensor element so that responsively to the drive signal the drive element generates a magnetic flux that travels through a target, determining a strain of the target using a picked up output signal picked up by the one or more sensor element, and detecting a proximity of the target using a picked up output signal picked up by the drive element.

There is set forth herein a method comprising applying a drive signal having a first frequency component and a second frequency component to a sensor assembly having a drive element and one or more sensor element so that responsively to the drive signal the drive element generates a magnetic flux that travels through a target, the magnetic flux having the first frequency component and the second frequency component, determining a strain of the target using a picked up output signal picked up by the one or more sensor element of the sensor assembly, and detecting a proximity of the target using a picked up output signal picked up by the sensor assembly.

There is set forth herein a sensor assembly comprising a drive element and one or more sensor element, wherein the sensor assembly is operative to apply a drive signal to the drive element so that responsively to the drive signal the drive element generates a magnetic flux that travels through a target, wherein the sensor assembly is operative to determine a strain of the target using a picked up output signal picked up by the one or more sensor element, and wherein the sensor assembly is operative to detect a proximity of the target using a picked up output signal picked up by the drive element.

There is also set forth herein a sensor assembly comprising a drive element and one or more sensor element, wherein the sensor assembly is operative to apply a drive signal having a first frequency component and a second frequency component to the drive element so that responsively to the drive signal the drive element generates a magnetic flux that travels through a target, the magnetic flux having the first frequency component and the second frequency component, wherein the sensor assembly is operative to determine a strain of the target using a picked up output signal picked up by the one or more sensor element of the sensor assembly, and wherein the sensor assembly is operative to detect a proximity of the target using a picked up output signal picked up by the sensor assembly.

DETAILED DESCRIPTION

There is set forth herein a method comprising applying a drive signal to a drive element in a sensor assembly having a drive element and one or more sensor element so that responsively to the drive signal the drive element generates a magnetic flux that travels through a target, determining a strain parameter of the target using a picked up output signal picked up by the one or more sensor element and detecting a proximity of the target using a picked up output signal picked up by e.g., the drive element or other magnetic flux sensitive element. The other magnetic flux sensitive element can be, e.g., a sensor element or an element of the sensor assembly external to a sensor element. In one embodiment, the drive signal can include a plurality of frequency components, with one or more lower frequency component resulting in a lower frequency magnetic flux component that travels relatively farther into a target and one or more higher frequency component that results in a higher frequency magnetic flux component that travels relatively shorter distances into a target.

Figure 1:
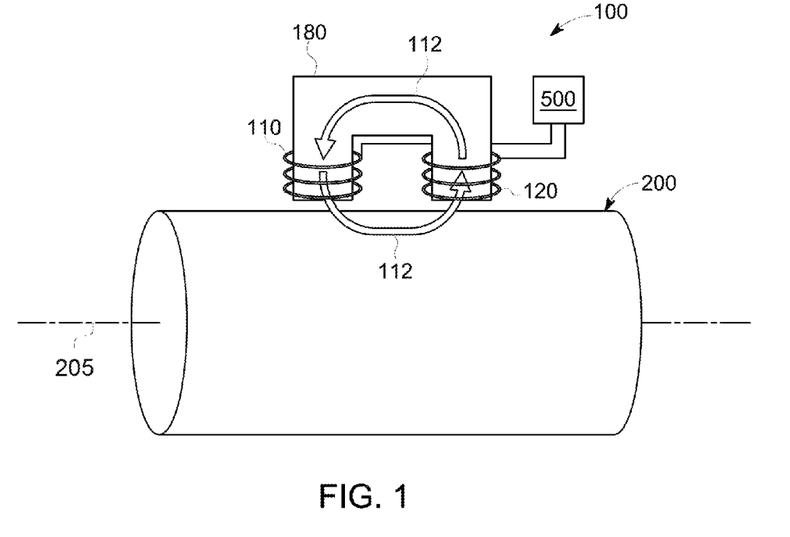
FIG. 1 is a side view schematic diagram of a sensor assembly for sensing characteristics of a target.

A sensor assembly 100 for use in performing a method set forth herein is shown in FIG. 1. Sensor assembly 100 can include a drive element 110 and a sensor element 120, and can be placed proximate of target 200. Drive element 110 and sensor element 120 can be supported by a common core 180 comprising ferrous material. Core 180 can be operative to increase flux density. In one embodiment, core 180 can be provided by an air core. In the embodiment of FIG. 1 target 200 is provided by a rotating shaft rotating about shaft axis 205. A drive signal can be applied to drive element 110. Responsively to a drive signal, drive element 110 can generate a magnetic flux 112. Magnetic flux indicated by path 112 can travel through target 200 return to core in an area of sensor element and can be sensed by the generation of a picked up output signal picked up by sensor element 120. As indicated by flux path 112 magnetic flux can pass through a section of target 200, return to core 180 in an area about sensor element 120 and continue to travel along path 112 through core 180 to drive element 110. As indicated by path 112 some magnetic flux passes through drive element 110. Fluctuations in a magnetic permeability of target 200 can affect a picked up output signal picked up by sensor element 120. A strain of target 200 can impact such fluctuations. Accordingly, a picked up output signal picked up by element 120 can be used to determine a strain of target 200. A drive signal that includes first and second frequency components can result in magnetic flux having the first and second frequency components as well as picked up output signals picked up by sensor assembly 100 having the first and second frequency components.

In another aspect sensor assembly 100 can comprise processing and drive circuit 500 as set forth herein. In one aspect processing and drive circuit 500 can be operative to use an output signal of both sensor element 120 and drive element 110 in the development of target characterizing data. In another aspect processing and drive circuit 500 can be operative to drive element 110 with a multiple frequency drive signal and can further be operative to process corresponding multiple frequency output signals from one or more element, e.g., sensor element 120 and drive element 110.

In the embodiment of FIG. 1, target 200 can be provided by a rotating shaft, e.g., a rotating shaft of a gas, steam, water or wind turbine, a rotating shaft of a combined cycle plant, compressor or pump. Target 200 can also be any alternative structural body, e.g., a beam. Target 200 can comprise ferromagnetic material, e.g., iron or steel.

Figure 2:
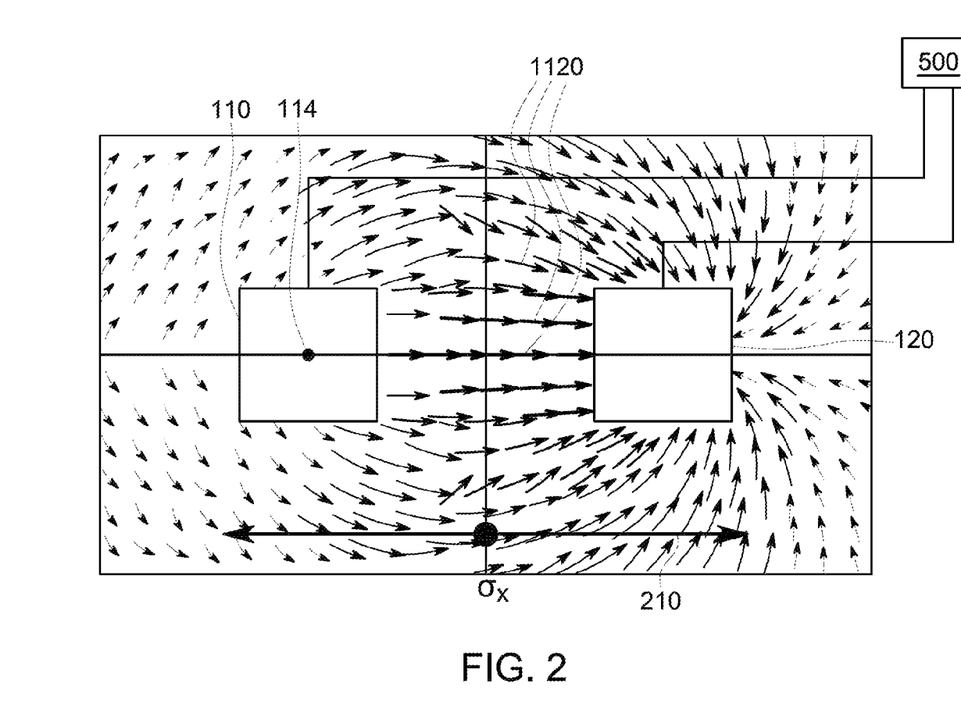
FIG. 2 is a top view schematic diagram of a sensor assembly for sensing characteristics of a target.

Sensor assembly 100 can be used to determine a strain of a target 200. In one embodiment, sensor assembly 100 can be used as a linear stress sensor (e.g., for determination of a bending moment). In one example, sensor assembly 100 can be used as a biaxial (two-dimensional) stress sensor (e.g., as a torque sensor).

Where sensor assembly 100 includes one or more pole pair, e.g., drive element 110 and sensor element 120 as set forth in FIG. 1, sensor assembly 100 can be used to determine a strain parameter of a target 200 in a uniaxial stress environment. In FIG. 2 there is a shown a top view of a sensor assembly 100 as set forth in FIG. 1 aligned so that a majority of flux lines 1120 are aligned to a uniaxial stress vector 210 of a body undergoing strain testing. In another embodiment flux lines 1120 can be partially aligned to a uniaxial stress vector 210.

Figure 3:
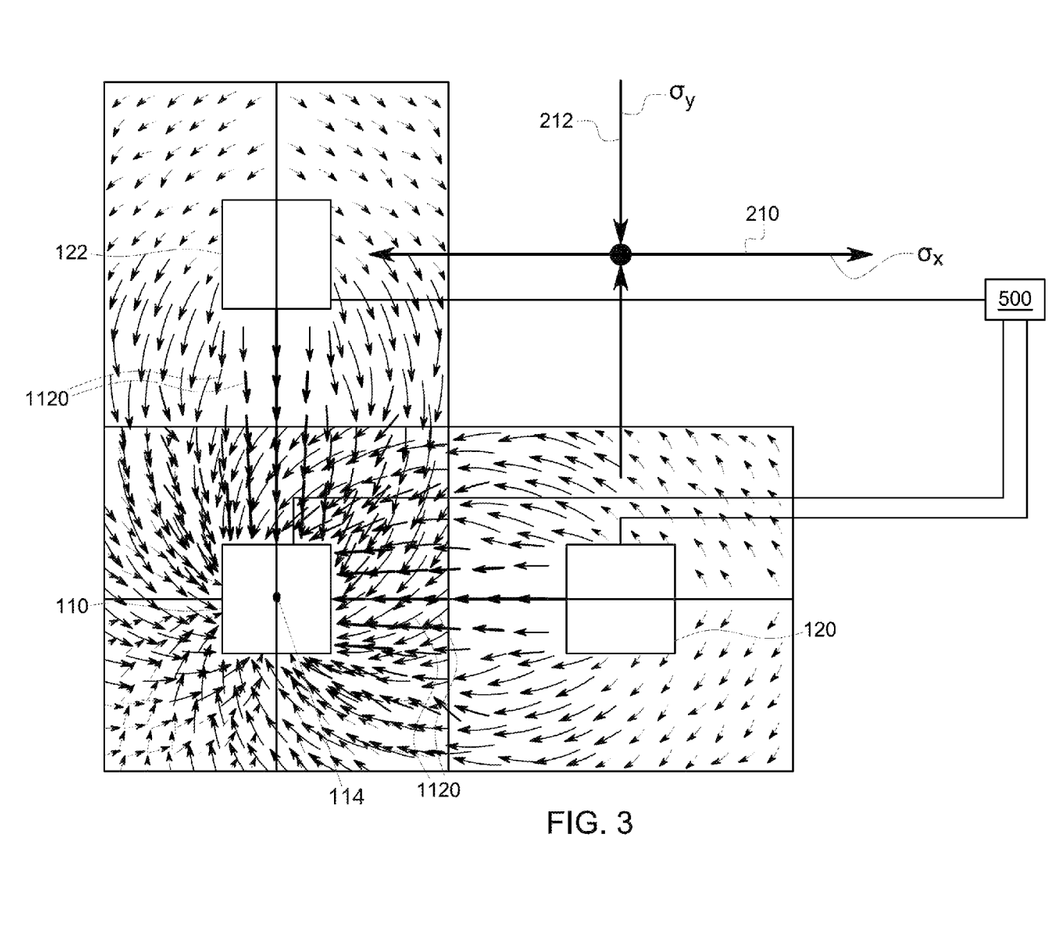
FIG. 3 is a top view of sensor assembly having two pole pairs.

In the embodiment depicted in FIG. 3 sensor assembly 100 includes a second sensor element 122, and three elements in total; namely drive element 110, sensor element 120 and second sensor element 122. Drive element 110 and second sensor element 122 forms a second pole pair, with the first pole pair being defined by drive element 110 and sensor element 120. With a majority of flux lines 1120 being aligned with directions $\sigma_x$, $\sigma_y$ of biaxial stress vectors 210, 212 (flux lines can also be partially aligned), sensor assembly 100 can be used for strain parameter determination in a biaxial stress $\sigma_x$, $\sigma_y$ environment, e.g., for torque sensing. A sensor assembly 100 can be adapted for sensing along added axes, e.g., by rotating sensor assembly 100 about axis 114 (FIG. 2 and FIG. 3).

In another aspect, sensor assembly 100 can be adapted for sensing output signals of a target 200 in a complex stress environment. For example, sensor assembly 100 can be configured to include additional pole pairs, and/or can be rotated, e.g., about axis 114 (FIG. 2 and FIG. 3) to facilitate sensing along additional axes.

Regarding drive element 110, drive element 110 can be provided by e.g., a magnetic field generator. In one embodiment the magnetic field generator can be provided by a drive coil. Regarding one or more sensor element 120, 122, 124, 126, one or more sensor element 120, 122, 124, 126 can be provided e.g., by a sensor coil, a Hall effect sensor, a magnetostrictive sensor, a flux gate sensor, a fiber optic based magnetic flux sensor.

Further aspects of processing and drive circuit 500 are now described. In one embodiment, processing and drive circuit 500 can comprise sensing and drive circuit 502 and a digital signal processing circuit 504. An exemplary sensing and drive circuit 502 and an exemplary digital signal processing circuit 504 which can process signals output by sensor assembly 100 after digitization are set forth herein.

Figure 4:
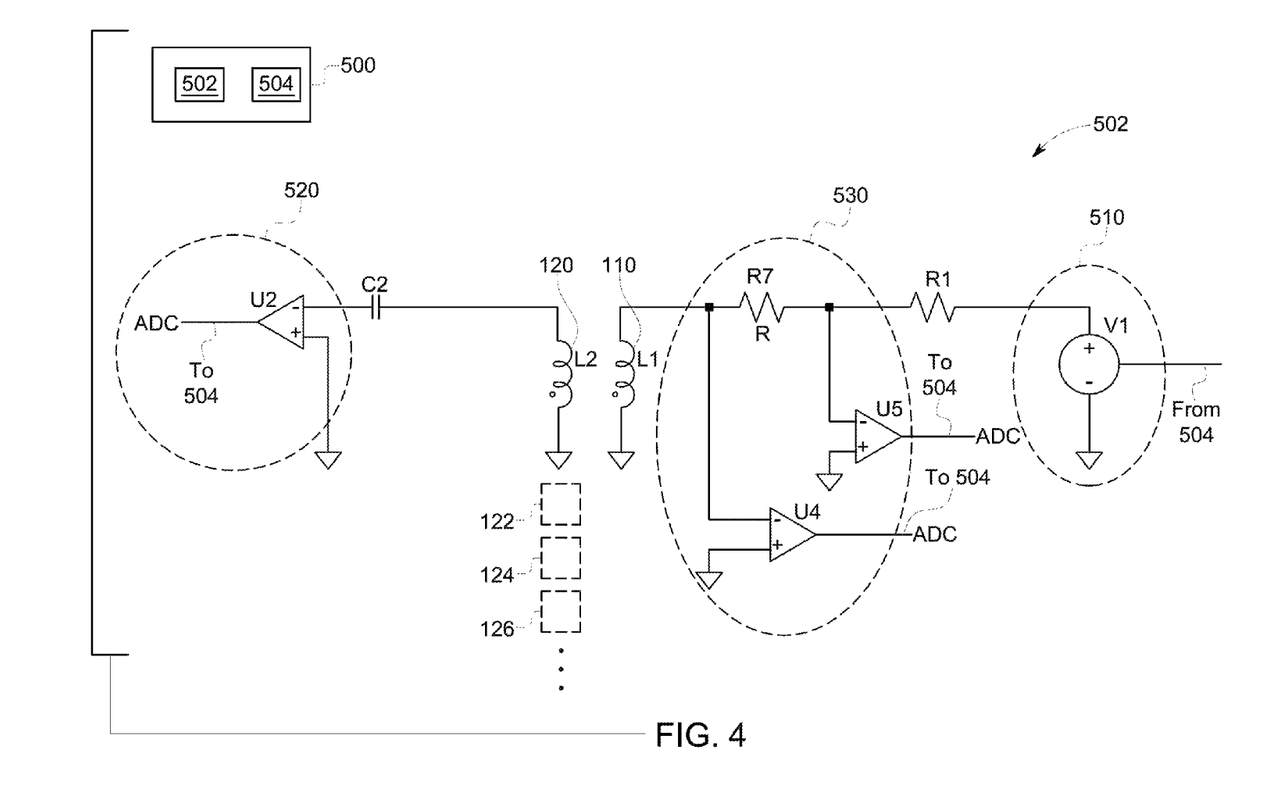
FIG. 4 is a schematic diagram of a drive and sensing circuit for applying a drive signal to a drive element of a sensor assembly.
Figure 8:
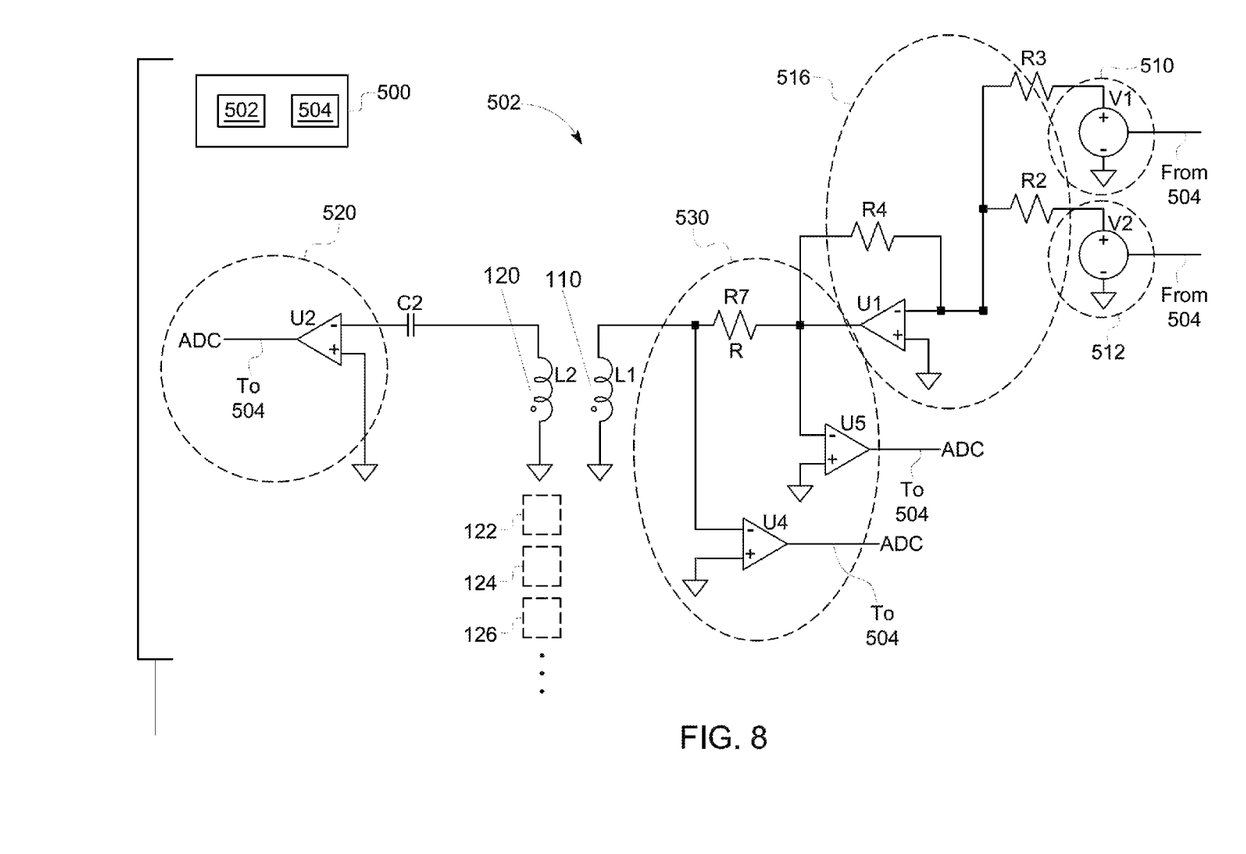
FIG. 8 is a schematic diagram of a drive and sensing circuit in an alternative embodiment.

Referring to sensing and drive circuit 502, examples of which are set further in FIGS. 4 and 8, sensing and drive circuit 502 can include alternating current power source 510, a sensing circuit 520 for sensing signals of sensor element 120 and an excitation circuit 530 for exciting magnetic flux and for sensing returned signals picked up by drive element 110. Circuit 502 can include additional sensing circuits configured in the manner of circuit 520 for each additional sensor element 120 included in sensor assembly 100, e.g., one or more additional sensor elements 122, 124, 126. Sensor assembly 100 can comprise one or more drive element and sensor element in addition to those depicted in FIGS. 4 and 8 or fewer than those depicted in FIGS. 4 and 8.

Figure 5:
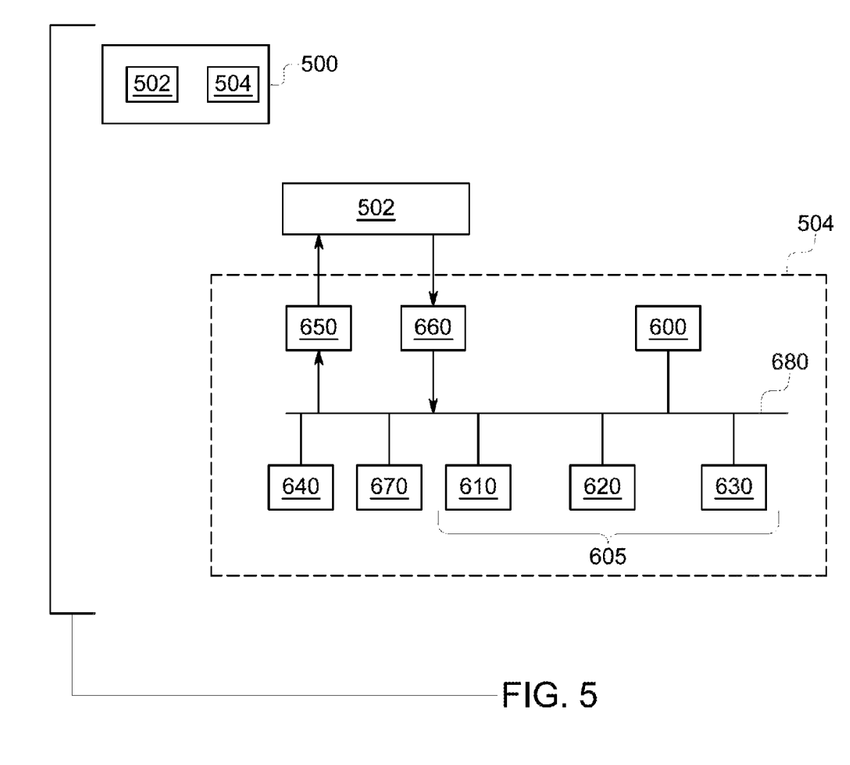
FIG. 5 is a block diagram of a digital signal processing circuit.

Processing and drive circuit 500 of sensor assembly 100 can include additional circuitry as are set forth in FIG. 5 illustrating an exemplary digital signal processing circuit 504. Digital signal processing circuit 504 can include a central processing unit 600 (CPU) and a memory 605 which can comprise a volatile memory 610 e.g., a random access memory 610, a non-volatile read only memory 620, and a storage memory 630, e.g., a hard disk, a flash memory device. CPU 600 can execute one or more software program for processing data output by sensor assembly 100. Circuit 504 can also include network communication interface 640 for providing communication with an external processor equipped apparatus. Digital signal processing circuit 504 can also include an input interface 650 for inputting data to sensing and drive circuit 502 and output interface 660 for receiving output signals from sensing and drive circuit 502. Circuit 504 can also include a display 670 connected to system bus 680 for displaying data measured using assembly 100 to one or more operator, for use, e.g., in condition monitoring. An operator observing display 670 can be, e.g., an operator of sensor assembly 100 and/or of target 200. In one embodiment display 670 can be a touch screen display that facilitates input of data as well as output of data by display of data. Input interface 650 can comprise one or more register and appropriate bus interface circuitry. Output interface 660 can comprise one or more analog to digital conversion and appropriate bus interface circuitry. Sensor assembly 100 can comprise a system bus 680 connecting the noted components 600, 610, 620, 630, 640, 650, 660, 670. The CPU based digital signal processing circuit 504 as set forth in FIG. 5 can be replaced e.g., with a field programmable gate array (FPGA) or an application specific integrated circuit (ASIC).

It has been set forth herein that sensor assembly 100 can be employed for determining strain of a target e.g., torque strain, bending moment strain. In another aspect, sensor assembly 100 can be utilized for detection of proximity to a target 200, otherwise known as offset. In one aspect proximity information can be used to compensate errors due to vibrations in sensor assembly 100 and/or target 200. Vibration measurements determined from proximity measurements can be used e.g., to adjust a strain determination output using one or more sensor element 120, 122, 124, 126. Sensor assembly 100 can be operative to determine a strain parameter of the target using a picked up output signal picked up by the one or more sensor element, e.g., one or more of sensor element 120, 122, 124, 126 and can be operative to detect a proximity of the target using a picked up output signal picked up by e.g., the drive element 110 or other magnetic flux sensitive element. The other magnetic flux sensitive element can be, e.g., a sensor element, e.g. sensor element 120, 122, 124, or 126 or an element of the sensor assembly 100 external to a sensor element 120, 122, 124, or 126.

In the development of sensor assembly 100 it was determined that an impedance of drive element 110 is dependent on a displacement to target 200. An impedance of drive element 110 is related to an amplitude of a return picked up output signal picked up by drive element 110. Accordingly, an amplitude of a picked up output signal picked up by drive element 110 can be used as a detection of proximity. In another aspect a drive signal applied to first drive element 110 can be modulated with use of a servo signal. Such determined servo signal can be used as a detection of proximity of sensor assembly 100 to target 200 i.e., an offset (gap distance) to target 200.

According to another approach for compensating for vibration, more than one sensor assembly may be disposed in relation to a target 200. For example, where the sensor assembly 100 is as shown in FIG. 1 being disposed proximate a top of the target another sensor assembly 100 can be disposed 180 degrees from sensor assembly 100 proximate a bottom of target 200. Accordingly a narrowing of an air gap on one side of the target can be realized as an increase in an air gap on an opposite side of the target and vice versa. Outputs of the two sensor assemblies can be vectorially summed so as to compensate for changes in proximity over time (vibrations).

The outlined multiple sensor assembly approach increases cost since multiple sensor assemblies need to be deployed. Also, the outlined multiple sensor assembly approach is only able to solve common mode vibration errors and is not able to resolve non-common mode vibration errors. Notwithstanding, in various embodiments it is highly advantageous to implement the multiple sensor assembly air gap compensation approach.

Figure 6:
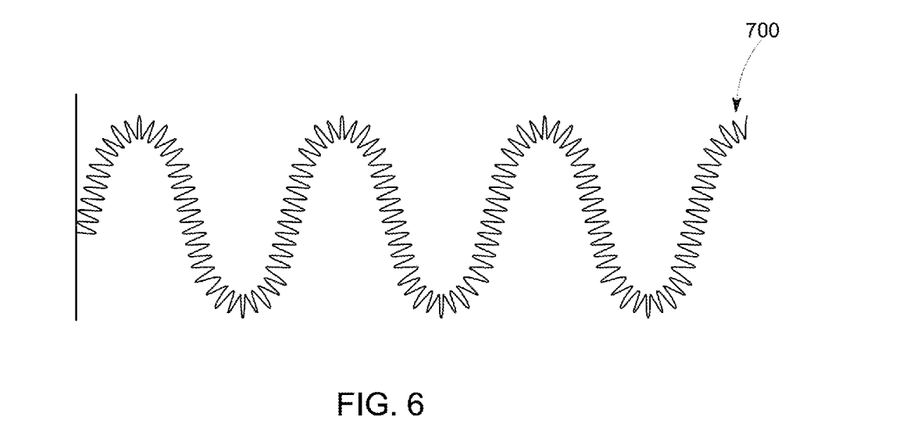
FIG. 6 is a depiction of a drive signal having a low frequency component and a superimposed high frequency component.
Figure 7:
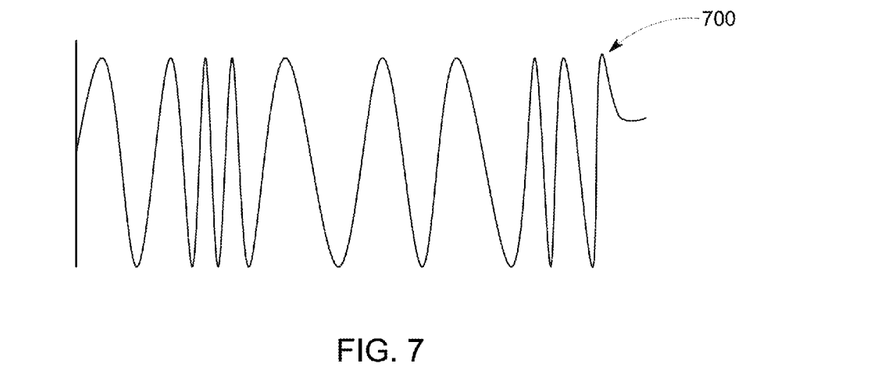
FIG. 7 is a depiction of a drive signal having time divided first and second frequencies.

In another aspect a drive signal 700 for driving drive element 110 can include a first frequency and a second frequency. The first frequency component and the second frequency component can include, e.g., superimposed frequency component as illustrated in FIG. 6 or time divided frequency components as illustrated in FIG. 7. As indicated in the embodiment of FIG. 8, sensing and drive circuit 502 can include a second alternating current power source 512 for applying a second frequency component for a drive signal. In one embodiment, a picked up first frequency component of an output signal resulting from application of a first relatively lower frequency drive signal component can be processed for strain determination and a picked up second frequency component of an output signal resulting from application of a second relatively higher frequency component of a drive signal can be processed for detecting proximity. A lower frequency component of drive signal 700 can generate lower frequency flux lines which can penetrate deeper into a target 200 than relatively higher frequency flux lines. Circuit elements of circuit 502 for processing a low frequency component of a picked up output signal resulting from drive signal 700 can include filter elements for filtering any high frequency components. Circuit elements of circuit 502 for processing a high frequency component of a picked up output signal resulting from drive signal 700 can include filter elements for filtering any low frequency components. In FIGS. 6 and 7, exemplary drive signal 700 is illustrated as having sinusoidal waveforms. Drive signal 700 can also comprise, e.g., square wave waveforms or saw tooth waveforms. A drive signal 700 in one embodiment can have a single frequency component. A drive signal 700 can also have more than two frequency components, e.g., three, four, or N frequency components.

In a further aspect sensor assembly 100 can be subject to set up (configuration) and then can be employed for determination of strain of and/or detection of proximity to a target. A set up can comprise establishing a mathematical model relating unknown strain and/or proximity to one or more output signal of sensor assembly 100. The one or more output signal can be e.g., an output (voltage and/or current) picked up by each one or more sensor element, e.g., sensor element 120, 122, 124, 126. The one or more output signal can be an output signal (voltage and/or current) picked up by one or more drive element 110. An established mathematical model can use an amplitude and phase difference of one or more of each pole pair of sensor assembly 100. An amplitude and phase difference can be provided for a given pole pair defined by a certain sensor element and drive element based on a voltage output of the sensor element and the current output of the drive element. An establishing of a mathematical model for determination of an unknown strain and/or proximity detection can use one or more of material and geometry data of one or more of a sensor assembly and a target, simulation data in which simulated outputs of sensor assembly 100 are recorded for one or more simulated test stress environment and test data in which outputs of sensor assembly 100 are recorded for one or more test stress environments.

In one embodiment, a set up of sensor assembly 100 can comprise a set up mode of operation in which sensor assembly is subject to one or more known test stress environments. In one embodiment, sensor assembly 100 can be operated in a setup mode of operation and in a run mode of operation. In a setup mode of operation, target 200 can subject to a plurality of known "test" stress environments. Output signals picked up by one or more sensor element e.g., sensor element 120, 122, 124, 126 can be recorded at each known stress environment as well as an output signal picked up by one or more drive element 110. The output signals can be output voltage signals and/or output current signals. At each "test" environment an amplitude and phase difference of each coupled drive element to sensor element signal can also be recorded. An amplitude and phase difference can be determined from an output voltage of a sensor element and an output current of a drive element. A mathematical model can then be established using the known input data (characterizing the known stress environment) and recorded output data so that parameters characterizing an unknown stress environment can be determined based on measured output signals output by sensor assembly 100.

In a run mode of operation the established mathematical model established using one or more of material and geometry data, simulation data, and test data can be employed to measure one or more various parameters (including strain parameter and a proximity parameter) characterizing an unknown stress environment by processing of an output signal of one or more sensor element and/or a drive element.

Example 1

Setup: A sensor assembly 100 having a single pole pair pole is provided (one drive element and one sensor element) and subject to various known stress environments. A test target is provided having single beam. In a first stress environment a known force can be applied to the beam in a known direction. In a second stress environment a known force of a second magnitude can be applied to the beam in a known direction. Test data is recorded by driving the drive element at a certain fixed frequency, $f_1$. The certain frequency can be a fixed frequency of between 500 Hz to 10 MHz. The recorded test data can include an output signal (a voltage and current) measured at drive element 110. Additionally, the recorded test data can include an output signal (a voltage) picked up by sensor element 120. Recorded test data can also include a determined signal phase and amplitude difference between a drive element current output by drive element 110 and a sensor element voltage output by sensor element 120. A mathematical model can be provided to relate the known parameters of the various known "test" stress environments to the recorded output data. The mathematical model can relate target strain and sensor assembly proximity (otherwise termed offset or gap) to (a) a sensor element output and (b) a drive element output as well as (c) drive element to sensor element coupling signal phase and amplitude difference determined from a sensor element output and a drive element output. The mathematical model can encompass known geometry and material parameters of the target 200.

Run mode: The mathematical model established on setup is employed to determine one or more strain parameter and to detect one or more proximity parameter in an unknown stress environment using (i) sensor element output (ii) drive element output and (iii) drive element to sensor element coupling signal phase and amplitude difference determined from (i) and (ii). For run mode measuring the sensor assembly drive element is driven at the drive frequency $f_1$ and the outputs (i) and (ii) as well as the derived value (iii) are processed in accordance with the established mathematical model to determine one of more strain parameter and to detect one or more proximity parameter. The one or more strain parameter can be e.g., a bending strain or a torque strain. The one or more proximity parameter can be a distance of sensor assembly 100 to a test target 200. The one or more proximity parameter can be used for providing an input into sensing and drive circuit 502 of sensor assembly 100 to improve a quality of testing measurements. The proximity parameter used to provide an input to sensing and drive circuit 502 for control of a drive signal can be regarded as a servo signal. In the development of sensor assembly 100 it was observed that a quality of measurements performed with sensor assembly 100 can be improved if a magnetic flux travelling through a target 200 is maintained at a substantially constant level over time. In one embodiment, a magnetic flux travelling through target 200 can be modulated with use of a proximity parameter by increasing an amplitude of a drive signal with increases in a detected proximity parameter and decreasing an amplitude of a drive signal with decreases in proximity measurements.

Example 2

Setup: A mathematical model relating unknown proximity parameter to sensor assembly output signals can be established simulation data and material and geometry data of sensor assembly 100 and target 200. In the simulation a fixed frequency, $f=f_3$ drive signal can be used, where $f_3$ is between 500 Hz and 10 MHz. Sensor assembly 100 can be provided to include three pole pairs. More specifically a sensor assembly 100 can be provided having a center drive element and sensor elements 90 degrees apart from a top view. The mathematical model can relate target strain and sensor assembly proximity (otherwise termed offset or gap) to (a) a sensor element output signal (voltage) of each sensor element and (b) a drive element output signal (voltage) as well as (c) drive element to sensor element coupling signal phase and amplitude difference determined from the sensor element outputs and a drive element output (a voltage output of the sensor elements, a current output of the drive element). The mathematical model can encompass known geometry and material parameters of the target 200.

Run mode: A target 200 can be subject to strain measurement and proximity measurement. The established mathematical model established at setup can be used to determine strain parameters. The mathematical model established on setup is employed to determine one or more strain parameter and one or more proximity parameter in an unknown stress environment using (i) sensor element output (ii) drive element output signals (voltage) picked up by drive element 110 and (iii) drive element to sensor element coupling signal phase and amplitude difference determined from sensor element output signal voltage and drive element current. For run mode determining of strain the sensor assembly drive element 110 can be driven with a multiple frequency component drive signal having the frequency components $f_3$ and $f_4$ and the outputs (i) and (ii) as well as the derived value (iii) can be processed in accordance with the established mathematical model to determine one of more strain parameter and to detect one or more proximity parameter. A picked up output signal can thus have the first and second frequency components, $f_3$ and $f_4$. Regarding the frequency component $f_4$, $f_4$ can be a relatively higher component of the drive signal and $f_3$ can be a relatively lower frequency component of the drive signal. The relatively higher frequency component of a picked up output signal resulting from application of the drive signal can be filtered out by circuit 500 for processing for determination of a strain parameter. The relatively lower frequency component of a picked up output signal resulting from application of the drive signal can be filtered out by circuit 500 for processing for measuring of a proximity parameter.

Strain parameters can be returned in the form of bending and torque parameters. A multiple frequency component drive signal can have two or more frequency components, including a low frequency component of $f=f_3$ and a high frequency component of $f=f_4$, where $f_4>100$ khz. Flux lines resulting from the high frequency component can penetrate only slightly into a target 200. A lower frequency ($f=f_3$) component of a picked up output signal can be processed and input to the mathematical model established at setup for determination of one or more strain parameter. A high frequency component of a picked up output signal can be used for proximity detection. With increases in proximity (gap distance) there will be increases in an output voltage of drive element 100. In such an embodiment, no output of any sensor element 120, 122, 124, 126 is used for detection of proximity. The determined proximity parameter can be output to display 670 as a measurement of vibration for observation by an operator, e.g., for use in operator assisted condition monitoring. The determined proximity parameter can also be output for modulation of an amplitude of a drive signal for driving drive element 110, so that magnetic flux through target 200 can be maintained at a substantially constant level over time. In a further aspect an impedance measurement of drive element 110 can be provided as a detecting of a proximity.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
applying a drive signal to a drive element in a sensor assembly having a drive element and one or more sensor element so that responsively to the drive signal the drive element generates a magnetic flux that travels through a target;
determining a strain of the target using a picked up output signal picked up by the one or more sensor element; and
detecting a proximity of the target using a picked up output signal picked up by the drive element.

2. The method of claim 1, wherein the method includes modulating the drive signal using the detected proximity for maintaining the magnetic flux through the target substantially constant over time.

3. The method of claim 1, wherein the determining a strain includes further using the picked up output signal picked up by the drive element.

4. The method of claim 1, wherein the determining a strain includes using a picked up return voltage signal picked up by the one or more sensor element and further using a picked up output current signal picked up by the drive element.

5. The method of claim 1, wherein the detecting a proximity is devoid of using an output signal output by the one or more sensor element.

6. The method of claim 1, wherein the detecting a proximity includes further using an output signal picked up by the one or more sensor element.

7. The method of claim 1, wherein the determining a strain includes determining a torque strain.

8. The method of claim 1, wherein the determining a strain includes determining a bending strain.

9. The method of claim 1, wherein the method includes using magnetostriction.

10. The method of claim 1, wherein the detecting a proximity includes using a servo signal input.

11. The method of claim 1, wherein the detecting a proximity includes using an impedance of the drive element.

12. The method of claim 1, wherein the applying a drive signal includes modulating the drive signal with a servo signal and wherein the detecting a proximity includes using the servo signal.

13. The method of claim 1, wherein the applying includes applying a drive signal having a first frequency component and a second frequency component such that the magnetic flux contains the first frequency component and the second frequency component.

14. The method of claim 1, wherein the method includes displaying a detected proximity parameter for observation by an operator.

15. A method comprising:
applying a drive signal having a first frequency component and a second frequency component to a sensor assembly having a drive element and one or more sensor element so that responsively to the drive signal the drive element generates a magnetic flux that travels through a target, the magnetic flux having the first frequency component and the second frequency component;
determining a strain of the target using a picked up output signal picked up by the one or more sensor element of the sensor assembly; and
detecting a proximity of the target using a picked up output signal picked up by the sensor assembly.

16. The method of claim 15, wherein the determining a strain includes processing a first frequency component of the picked up output signal picked up by the one or more sensor element of the sensor assembly resulting from application of the first frequency component of the drive signal and wherein the detecting a proximity includes processing a second frequency component of the picked up output signal picked up by the sensor assembly resulting from application of the second frequency component of the drive signal.

17. The method of claim 16, wherein the first frequency component of the picked up output signal picked up by the one or more sensor element of the sensor assembly used for strain determination is of a lower frequency than the second frequency component of the picked up output signal picked up by the sensor assembly used for proximity detection.

18. The method of claim 15, wherein the first frequency component and the second frequency component of the drive signal comprise a relatively lower frequency component and relatively higher frequency component, wherein the determining a strain includes filtering out a relatively higher frequency output signal component and wherein the detecting a proximity includes filtering out a relatively lower frequency output signal component.

19. The method of claim 15, wherein the method includes displaying a detected proximity parameter for observation by an operator.

20. A sensor assembly comprising:
a drive element and one or more sensor element, wherein the sensor assembly is operative to apply a drive signal to the drive element so that responsively to the drive signal the drive element generates a magnetic flux that travels through a target;
wherein the sensor assembly is operative to determine a strain of the target using a picked up output signal picked up by the one or more sensor element; and
wherein the sensor assembly is operative to detect a proximity of the target using a picked up output signal picked up by the drive element.

21. A sensor assembly comprising:
a drive element and one or more sensor element, wherein the sensor assembly is operative to apply a drive signal having a first frequency component and a second frequency component to the drive element so that responsively to the drive signal the drive element generates a magnetic flux that travels through a target, the magnetic flux having the first frequency component and the second frequency component;
wherein the sensor assembly is operative to determine a strain of the target using a picked up output signal picked up by the one or more sensor element of the sensor assembly; and
wherein the sensor assembly is operative to detect a proximity of the target using a picked up output signal picked up by the sensor assembly.

22. The sensor assembly of claim 21, wherein the sensor assembly is operative to determine a strain by processing a first frequency component of the picked up output signal picked up by the one or more sensor element of the sensor assembly resulting from application of the first frequency component of the drive signal and wherein the sensor assembly is operative to detect a proximity by processing the second frequency component of a picked up output signal picked up by the sensor assembly resulting from application of the second frequency component of the drive signal.

23. The sensor assembly of claim 22, wherein the first frequency component of the drive signal is lower than the second frequency component of the drive signal.

24. The sensor assembly of claim 21, wherein the picked up output signal picked up by the sensor assembly used to detect proximity is an output signal selected from the group consisting of an output signal picked up by the drive element, an output signal picked up by the one or more sensor element and an output signal picked up by an element of the sensor assembly external to the drive element and the one or more sensor element.

25. The sensor assembly of claim 24, wherein the sensor assembly is operative to detect a proximity of the target using a picked up output signal picked up by the drive element, and further using a picked up output signal picked up by the one or more sensor element.

* * * * *